Nov. 12, 1957   J. H. TEUTSCH   2,812,971
HOIST LIFT CONNECTION FOR DIES
Filed June 1, 1954
FIG.I.
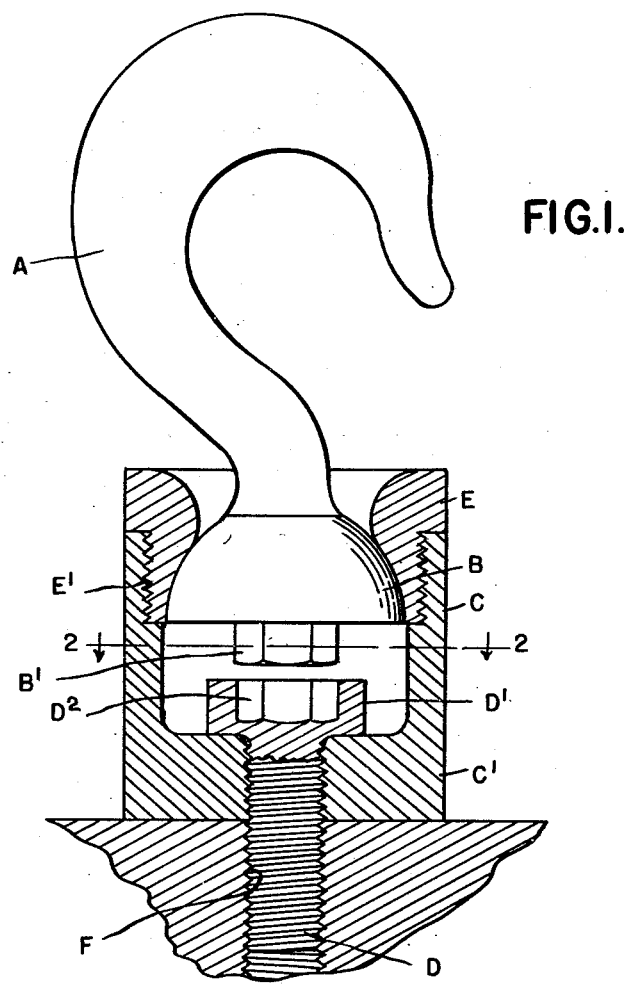
FIG.2.
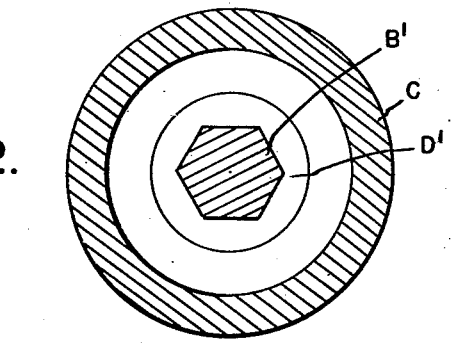
INVENTOR.
JOHN H. TEUTSCH
BY
*Whittemore Hulbert & Belknap*
ATTORNEYS

United States Patent Office 2,812,971
Patented Nov. 12, 1957

2,812,971

HOIST LIFT CONNECTION FOR DIES

John H. Teutsch, St. Clair Shores, Mich.

Application June 1, 1954, Serial No. 433,330

3 Claims. (Cl. 294—78)

The invention relates to lift connections for attachment to dies or other heavy members to enable the handling of the same by a hoist. It has heretofore been the practice to form such connections by eye members having threaded shanks and forming tapped bores in the member to be lifted at a plurality of spaced points, each of which is engaged by one of said eye members. Such connections have been found to be unsatisfactory, particularly when used in connection with chain hoists for the reason that torque stresses are frequently transmitted from the chain to the eye member. This may have the result either of unscrewing the threaded shank thereby loosening the same or by transmitting torque in the reverse direction causing the twisting off of the eye from its shank. Another defect of such connections is that if the pull of the chain is not exactly vertical (and it seldom is), this may concentrate stresses on the shank sufficient to break the same.

It is the object of the invention to obtain a construction which avoids such defects and which also facilitates engaging the connection with or disengaging it from the member to be lifted.

With these objects in view the invention consists in the construction as hereinafter set forth.

In the accompanying drawings:

Fig. 1 is a vertical section partly in elevation of my improved lift connection as engaged with a die or other member to be lifted;

Fig. 2 is a horizontal section on line 2—2, Fig. 1.

A is the member to be directly engaged by the hoist and which may be either an eye member or preferably as shown a hook. The shank of this member terminates in a head B which is of a segmental spherical form. C is a member for attachment to the member to be lifted which is also hollow and constitutes a socket for receiving the head B and forming in connection therewith a universal joint. The member C is provided with a screw threaded shank D which may be integral therewith but preferably is formed of a separate headed bolt which is screwed through the bottom portion C' of the member C to project downward therebeyond. The spherical bearing of the socket which engages the head B is formed by an annular member E. This has a threaded engagement E' with the upper portion of the hollow member C and forms a means for attaching the hook to said member. As the stress transmitted from the hook to the member C is always in an upward direction the head B is cut away below the segmental spherical surface thereof to clear the head D' of the bolt D and to permit of a limited universal movement with respect to the member C. However, the member A with its head B is constructed to perform another useful function, viz., that of a wrench for tightening or loosening the threaded shank D with respect to the member lifted. To accomplish this function the head D' is provided with an upwardly opening polygonal socket D² therein and the head B is provided with a central downward projection B' of a corresponding polygonal form. When the hook A is pulled upward into contact with the spherical bearing in the member E the portions B' and D' are slightly spaced from each other so that there will be no interference with the universal movement or swivelling of the head B.

With the construction as above described to engage the lifting connection with the member to be lifted it is only necessary to form in the latter a threaded aperture F for engagement of the threaded shank D. The whole assembly may then be attached by screwing the shank D into the threaded aperture F and tightened therein by engaging the polygonal portion B' with the polygonal socket D² and using the hook A as a wrench. This wrench may also be used for loosening the threaded shank when the lifting assembly is to be removed. When the chain of the hoist is engaged with the hook A the initial upward movement will disengage the portion B' from the polygonal socket D² and into contact with the spherical bearing on the member E. Frequently the chain of the hoist is more or less twisted before engagement with the hook so that when pulled upward torque stresses will be transmitted therefrom to the hook. However, the latter is free to swivel in its socket and, therefore, will not transmit such stresses to the member C or threaded shank D. If the pull of the chain is not directly vertical the hook A will assume a corresponding angle by the pivotal action of the head B in the member E. Another important feature of the construction is that the bottom of the member C forms an annular bearing against the surface of the member to be lifted, surrounding and concentric with the threaded shank D. This will prevent communication of any angular stress to the shank D and, therefore, will avoid breakage.

Die members are frequently very heavy, running into hundreds or thousands of pounds and are also very costly. My improved lift connection provides a means for safely lifting such members as is not always the case with constructions that have heretofore been used for this purpose.

What I claim as my invention is:

1. A hoist lift connection comprising a hollow socket member, a headed bolt rotatably engaging a central aperture through the bottom portion of said member with its head inside the hollow thereof and its shank threadedly engaging an aperture in the work to be lifted, a hoist engaging member having a segmental spherical head within and forming a swivel engagement with said socket member with limited angular movement from its vertical axis and also having clearance for a limited vertical movement within the hollow socket member, and torque transmitting means between said heads engageable when said hoist engaging member is at its lower limit of vertical movement to form a wrench for turning said bolt and being completely disengaged when under the upward stress of the hoist and in all angular positions thereof to permit free swiveling.

2. A construction as in claim 1 in which said torque transmitting means comprises a polygonal projection on one of said heads and a correspondingly shaped recess in the other.

3. The construction as in claim 2 in which said polygonal recess is in the bolt head and said projection is on the underside of said segmental spherical head.

References Cited in the file of this patent

UNITED STATES PATENTS 2,078,631    Gagne    Apr. 27, 1937
2,552,219    Schleicher    May 8, 1951